US012492295B2

(12) United States Patent
Crippa

(10) Patent No.: US 12,492,295 B2
(45) Date of Patent: Dec. 9, 2025

(54) APPARATUS AND METHOD FOR DEPOLYMERIZATION OF POLYMERS

(71) Applicant: GR3N SA, Pregassona (CH)

(72) Inventor: Maurizio Crippa, Pregassona (CH)

(73) Assignee: GR3N SA, Pregassona (IT)

( * ) Notice: Subject to any disclaimer, the term of this patent is extended or adjusted under 35 U.S.C. 154(b) by 873 days.

(21) Appl. No.: 17/775,666

(22) PCT Filed: Nov. 11, 2020

(86) PCT No.: PCT/IB2020/060622
§ 371 (c)(1),
(2) Date: May 10, 2022

(87) PCT Pub. No.: WO2021/094949
PCT Pub. Date: May 20, 2021

(65) Prior Publication Data
US 2022/0403132 A1   Dec. 22, 2022

(30) Foreign Application Priority Data

Nov. 11, 2019 (IT) .................. 102019000020784

(51) Int. Cl.
*C08G 63/00* (2006.01)
*B01J 19/00* (2006.01)
*B01J 19/12* (2006.01)
*B09B 3/50* (2022.01)
*C08J 11/10* (2006.01)

(52) U.S. Cl.
CPC .......... *C08J 11/10* (2013.01); *B01J 19/0013* (2013.01); *B01J 19/0066* (2013.01); *B01J 19/126* (2013.01); *B09B 3/50* (2022.01); *B01J 2204/005* (2013.01); *B01J 2219/00083* (2013.01); *B01J 2219/00103* (2013.01); *B01J 2219/0879* (2013.01); *B01J 2219/1239* (2013.01); *B01J 2219/1269* (2013.01); *C08J 2367/02* (2013.01)

(58) Field of Classification Search
USPC .......... 528/190, 193, 196, 271, 272; 521/48
See application file for complete search history.

(56) References Cited

U.S. PATENT DOCUMENTS

| 5,471,037 | A | * | 11/1995 | Goethel | ............... | B01J 19/2415 |
| | | | | | | 204/157.43 |
| 6,184,427 | B1 | * | 2/2001 | Klepfer | ................ | C10G 1/10 |
| | | | | | | 201/2.5 |
| 9,545,609 | B2 | * | 1/2017 | Van Thorre | ............... | C10G 1/08 |
| 2007/0131591 | A1 | | 6/2007 | Pringle | | |
| 2012/0138601 | A1 | | 6/2012 | Hemmings et al. | | |

FOREIGN PATENT DOCUMENTS

| CN | 101456809 A | 6/2009 |
| CN | 104479168 A | 4/2015 |
| JP | H10500369 A | 1/1998 |
| JP | 2004250561 | 9/2004 |
| KR | 20110017184 A | 2/2011 |
| KR | 20110099484 A | 9/2011 |
| KR | 20120128480 A | 11/2012 |
| WO | 2013014650 | 1/2013 |

OTHER PUBLICATIONS

International Preliminary Report on Patentability, dated Feb. 7, 2022, in connection with International Application No. PCT/IB2020/060622 (18 pages).
International Search Report and Written Opinion of the International Searching Authority, dated Mar. 19, 2021, in connection with International Application No. PCT/IB2020/060622 (13 pages).
Second Written Opinion of the International Preliminary Examining Authority, dated Nov. 3, 2021, in connection with International Application No. PCT/IB2020/060622 (6 pages).
First Office Action issued in connection with Chinese Patent Appl. 202080092305.3 dated Dec. 12, 2023, with English translation (20 pages).
Office Action issued in connection with Korean Patent Application No. 10-2022-7019750 and machine translation thereof, dated May 22, 2025, 29 pages.

* cited by examiner

*Primary Examiner* — Terressa Boykin
(74) *Attorney, Agent, or Firm* — KLINTWORTH & ROZENBLAT LLP

(57) ABSTRACT

An apparatus for depolymerization of polymers, in particular polyesters, polyamides, polyurethanes and polycarbonates, comprises a microwave depolymerization reactor having a reaction chamber; a microwave generation and transport system to send microwaves into the reaction chamber and comprising a microwave generator and a guide device housed in the reaction chamber to convey and distribute microwaves in the reaction chamber; a mixing device, rotating around the axis in the reaction chamber and configured so as to dynamically distribute inside the reaction chamber a mixture of liquids and solids contained in the reaction chamber; and a pressurization system configured to vary the pressure within the reaction chamber.

25 Claims, 2 Drawing Sheets

APPARATUS AND METHOD FOR DEPOLYMERIZATION OF POLYMERS

CROSS-REFERENCE TO RELATED APPLICATIONS

This patent application claims priority from Italian patent application no. 102019000020784 filed on Nov. 11, 2019, the entire disclosure of which is incorporated herein by reference.

TECHNICAL FIELD

The present invention concerns an apparatus and a method for the depolymerization of polymers, in particular polyesters, polyamides, polyurethanes and polycarbonates.

BACKGROUND ART

As is known, various polymer materials, widely used to produce a variety of products, can be recovered and re-used at the end of their working life, instead of being sent to landfill.

In particular, some polymer materials such as, for example, polyesters, polyamides, polyurethanes and polycarbonates, can be depolymerized, namely reduced to the form of monomers (or oligomers) in order to be then re-polymerized to produce new products.

In general, these materials are first ground and reduced to granules, and then undergo depolymerization reactions in appropriate process conditions.

Although various depolymerization reactions are known, in particular of polyesters, polyamides, polyurethanes and polycarbonates, it can be complicated to implement these reactions on an industrial scale with completely satisfactory results, especially in terms of simplicity, yield, efficiency and process speed.

Indeed, a reaction described at experimental or laboratory level does not always lend itself to industrial exploitation in practice; in certain cases, a given reaction can be exploited only by recourse to relatively complicated and/or costly plants and/or by means of processes that are not particularly advantageous overall, or are in any case subject to improvement.

WO2013/014650-A1 describes a method and an apparatus for recycling by means of depolymerization of polymer materials, specifically polyesters and polyamides, which lends itself to use on an industrial scale and is simple, effective and inexpensive. However, the method and the apparatus of WO2013/014650-A1 have further margins of improvement, in particular in terms of simplicity of construction and use, and efficiency.

In particular, the solution of WO2013/014650-A1 does not allow integration in the same apparatus of both the chemical depolymerization reaction and at least some of the subsequent separation phases of the reaction products.

DISCLOSURE OF INVENTION

An object of the present invention is to provide an apparatus and a method for the depolymerization of polymers, in particular polyesters, polyamides, polyurethanes and polycarbonates, which is an improvement on the solutions of the known art; in particular, an object of the invention is to provide an apparatus and a method that allow the depolymerization reaction to be carried out on an industrial scale and in a simple, effective and inexpensive manner.

In accordance with said objects, the present invention concerns a method and an apparatus for depolymerization of polymers, in particular polyesters, polyamides, polyurethanes and polycarbonates, as defined in essential terms in the attached claims 1 and 16 respectively and, for the preferred additional characteristics, in the dependent claims.

The apparatus and the method according to the invention allow effective recovery of the monomers constituting the polymers treated (in particular polyesters, polyamides, polyurethanes and polycarbonates) and their re-introduction into the production cycle of the corresponding polymers, also on an industrial scale, in a simple, effective and inexpensive manner.

In particular, the invention allows both the chemical depolymerization reaction and some of the subsequent reaction product separation steps to be integrated in the same apparatus.

Furthermore, the invention allows the intrinsic limit of the microwave electromagnetic radiation (especially at the frequencies of interest for the depolymerization reactions, indicatively ranging from 300 MHz to 300 GHz), i.e., its limited liquid penetration power, to be effectively overcome.

In particular, the invention allows effective use of the microwave radiations in a depolymerization reaction so that the liquid components of the reaction are always in contact with the solid parts, but without being interposed as an obstacle to the radiation.

The invention uses the same elements allowing acceleration of the reaction through the microwaves to then simplify separation of the liquid components from the solid ones in the reacted mixture.

BRIEF DESCRIPTION OF THE DRAWINGS

Further characteristics and advantages of the present invention will appear clear from the description of the following non-limiting embodiment examples, with reference to the attached figures in which.

BEST MODE FOR CARRYING OUT THE INVENTION

Figure 1:
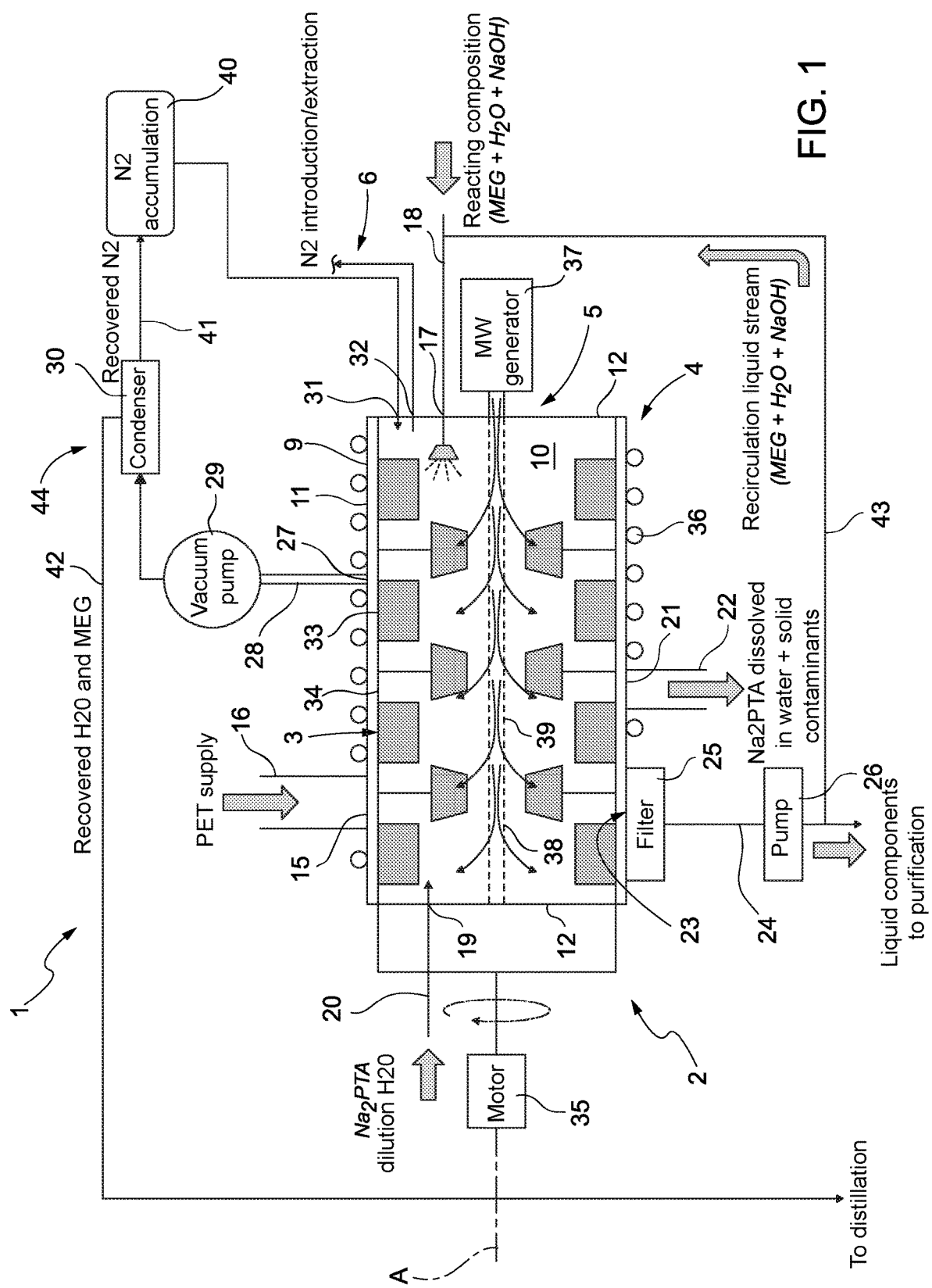
FIG. 1 shows in schematic form an apparatus for depolymerization of polymers in accordance with a first embodiment of the invention.

In FIG. 1 the number 1 indicates overall an apparatus for depolymerization of polymers, in particular polyesters (and specifically polyethylene terephthalate and isomers thereof, PET) or polyamides (nylon 6, nylon 6,6).

In general (but not exclusively) the materials treated by the apparatus 1 are PET or other polyesters, or polyamides, or polyurethanes, or polycarbonates, or composite materials containing said polymers. In the following description particular reference will be made, by way of example, to the treatment of PET (said term also including composites containing PET) and therefore to the use of the apparatus 1 for depolymerization by means of alkaline hydrolysis of the PET.

It is understood that the apparatus 1 of the invention can be used also for other reactions.

The apparatus 1 comprises a microwave depolymerization reactor 2 provided with an internal mixing device 3, a thermal control system 4, a microwave generation and transport system 5, and a pressurization system 6.

The reactor 2 comprises a reactor vessel 9 which delimits an internal reaction chamber 10.

The vessel 9, for example having a substantially cylindrical shape, extends along and around a longitudinal axis A, for example rectilinear and (in the example shown, but not necessarily) substantially horizontal in use. It is understood that in use the vessel 9 (namely the reactor 2) can be oriented differently and the axis A can therefore be, instead of horizontal, vertical or also variously inclined relative to a horizontal plane (i.e., relative to the ground).

The vessel 9 is built of a material substantially opaque to the microwave electromagnetic radiations and resistant to corrosion. For example, the vessel 9 is made of steel or other metallic material.

The vessel 9 is designed to withstand both internal overpressure and internal underpressure relative to the atmospheric pressure.

The vessel 9 has a lateral wall 11, for example cylindrical, and a pair of terminal walls 12 at respective opposite axial ends which internally delimit the reaction chamber 10.

The reactor 2 is provided with a plurality of inlets and outlets, defined by respective openings formed in the vessel 9 and associated with respective ducts so as to allow introduction into the reaction chamber 10 of reagents necessary for the depolymerization reaction and auxiliary components, and drawing of reaction products and reaction residues from the reaction chamber 10.

In particular, the reactor 2 is provided with:
- at least one solid phase inlet 15, connected to a polymer supply duct 16 to supply the reaction chamber 10 with a polymer material to be treated (for example, PET in dispersed solid form, for example in flakes, granules, etc.);
- a first liquid phase inlet 17, connected to a reagent supply duct 18, to supply the reaction chamber 10 with a liquid reacting composition;
- a second liquid phase inlet 19, connected to an auxiliary supply duct 20, to supply the reaction chamber with auxiliary components;
- at least one reaction product outlet 21, connected to an outlet duct 22 to remove from the reaction chamber 10 reaction products that have formed in the reaction chamber 10;
- at least one liquid phase outlet 23, connected to an extraction duct 24 provided with a filter 25 and optionally with a drawing pump 26, to remove from the reaction chamber 10 a liquid stream and retain in the chamber 10 solid residues separated from the liquid stream;
- at least one gas phase outlet 27, connected to a gas outlet duct 28 provided with a vacuum pump 29 and connected to a condenser 30, to extract a gas phase from the reaction chamber 10;
- a service inlet 31 and a service outlet 32, connected to respective ducts of the pressurization system 6 to introduce and extract inert gas into/from the reaction chamber 10.

The mixing device 3 is housed inside the vessel 9, in the reaction chamber 10; said device is rotatable around the axis A, therefore also defining a rotation axis of the mixing device 3, and is configured so as to keep stirred, through its rotary motion, a mixture of liquids and solids (formed from the polymer and the reacting composition) contained in the vessel 9, dynamically distributing it inside the reaction chamber 10 both along the axis A, and radially relative to the axis A.

In particular, the mixing device 3 comprises a plurality of blades 33, which can be variously shaped, sized and arranged.

In a preferred embodiment, the blades 33 are integrally supported by a supporting structure 34 housed in the reaction chamber 10 and rotatable in the reaction chamber 10 around the axis A.

For example, the structure 34 comprises a basket housed in the vessel 9 and having a radially external lateral surface facing the lateral wall 11 of the vessel 9, and a radially internal lateral surface from which the blades 33 project radially towards the axis A.

The blades 33 can have different shapes and dimensions and be variously arranged on the structure 34.

It is understood that the mixing device 3 can be of another type with respect to the one indicated here purely by way of example, and can include blades variously arranged and having various shapes and dimensions.

For example, the blades 33, variously shaped, also strip-shaped, can extend from a supporting structure 34 positioned centrally in the reaction chamber 10 along the axis A.

In other embodiments, the mixing device 3 is integral with the vessel 9 and rotates integral with it around the axis A. The vessel 9 is then mounted rotatable on an external support and drags the blades 33 into rotation which extend, for example, from the lateral wall 11 of the vessel 9.

The mixing device 3 is driven by a motor 35, positioned for example on the outside of the vessel 9 and connected to the structure 34 (or to the vessel 9, if the latter is rotatable).

The thermal control system 4 is configured so as to extract or introduce thermal energy (heat) from/into the reaction chamber 10 inside the vessel 9 and therefore cool or heat the vessel 9 and the contents thereof. For example, the system 4 comprises at least one coil 36 wound around the lateral wall 11 of the vessel 9 and inside which a fluid circulates designed to transmit the heat, coming from a thermal unit where said fluid is appropriately heated or cooled.

The microwave generation and transport system 5 comprises a microwave generator 37, positioned preferably outside the vessel 9, and a guide device 38 associated with the generator 37 and housed in the reaction chamber 10 to convey and distribute, along the axis A and around the axis A, the microwaves generated by the generator 37 in the reaction chamber 10. For example, the guide device 38 comprises a wave guide 39 (of the leaking pipe type), having a pipe extending along the axis A of the vessel 9 between the terminal walls 12 and provided with lateral emission holes formed on a lateral wall of the pipe.

Indicatively (but not necessarily), microwaves are sent into the reaction chamber 10 with a frequency ranging from 300 MHz to 300 GHz.

The pressurization system 6 is configured to introduce and extract an inert gas into/from the reaction chamber 10, through the service inlet 31 and the service outlet 32 respectively. The inert gas is for example contained in a storage tank 40; for circulation of the inert gas a dedicated pump can be used or the same pump 29 as the one employed for extraction of the gas phase from the reaction chamber 10 through the gas phase outlet 27.

For example, the tank 40 is connected by means of a recovery line 41 to the condenser 30, from which it receives a gas (nitrogen) phase separated in the condenser 30, and to the duct 28 provided with the pump 29.

A further recovery line 42 exits from the condenser 30, from which it removes a liquid phase condensed by the condenser 30, and merges optionally into the extraction duct 24 downstream of the pump 26.

A recycling duct 43 connects the extraction duct 24 to the reagent supply duct 18.

The gas outlet duct 28 with the pump 29, the condenser 30 and the recovery lines 41, 42 thus define a recovery circuit 44 configured to recover from the reaction chamber 10 a gas phase and then separate from it a condensate (containing essentially $H_2O$ and MEG) which is recovered for example by means of distillation, and a gas (nitrogen) which is sent to the pressurization system.

The apparatus 1 is optionally connected to a grinding unit for preliminary mechanical treatment of the materials to be recycled and/or a mixing unit in which the reacting composition is prepared, namely where the reacting composition is prepared with predefined quantities of the various components.

The apparatus 1 is preferably used in a method for the depolymerization of polymers, in particular (but not only) of polyesters, polyamides, polyurethanes or polycarbonates.

The use of the apparatus 1 implementing said method is described below.

In the following example, the operation of the apparatus 1 is essentially discontinuous (batch mode); it is understood, however, that the apparatus 1 can operate also in continuous mode, in particular since it can be continuously supplied with liquid phase (reacting composition) and/or solid phase (polymer to be treated).

Step a) Reagent Loading and Reaching of Reaction Conditions.

At the beginning of a production cycle the polymer material to be treated (for example PET) and the reacting composition (for example, aqueous solution of NaOH or other alkaline hydroxide and ethylene glycol) are fed into the reaction chamber 10, separately through the respective supply ducts 16, 18, in proportions appropriate to efficient execution/starting of the depolymerization reaction.

In the loading step the mixing device 3 is at a standstill and the microwave generation and transport system 5 is off. The solid components (polymer material) do not require particular preparatory treatments, given the intrinsic robustness of the apparatus 1 and specifically of the reactor 2 and since solid-liquid mixtures do not have to be circulated in narrow diameter ducts.

The liquid components (reacting composition) are introduced at high temperature (near the reaction temperature) to speed up the transient start time.

Preferably, firstly the polymer material (PET) is introduced, at atmospheric pressure, for example by means of a pneumatic transport system (or similar). The polymer is introduced through the duct 16 which has a diameter such as to avoid any clogging problems.

The duct 16 can be connected directly to a branch of a transport system of the polymer material (for example a pneumatic system) or, in the case of high flows, to a dosing hopper, also to avoid excessive accumulation of material in a particular area of the reaction chamber 10 (in any case the mixing device 3, once operating, homogenizes the components).

The reactor 2 is then pressurized, introducing nitrogen (or other inert gas) by means of the pressurization system 6 and bringing the reaction chamber 10 to a predefined pressure.

For example, in the case of depolymerization of PET, the pressure is greater than or equal to 7 barg in order to avoid boiling of the reacting composition at high temperature; in this way, the liquid components can be introduced without risks of vaporization.

Given the high structural resistance that can be obtained with the configuration of the reactor 2, it is advantageous to operate at even higher pressures, for example 10 barg or higher. In this way it is possible to operate with a wider margin on the reaction temperatures; furthermore, the higher overpressure can be exploited during the extraction steps of the filtered liquid components, as described below.

Since an atmosphere with glycol in the vapour state, therefore potentially explosive, is created inside the reactor 2, it is advisable to use nitrogen as the pressurization gas.

Once the predefined pressure has been reached, the reacting composition is fed into the reaction chamber 10 through the inlet 17 and the duct 18.

The reacting composition constitutes the liquid component of the reagents of the depolymerization reaction. For example, in the case of depolymerization of PET, the reacting composition is composed essentially of sodium hydroxide (NaOH) dissolved in water and ethylene glycol (MEG), mixed together in appropriate proportions.

The reacting composition, in accordance with the invention, is introduced gradually into the reaction chamber 10, extracting the liquid content of the reaction chamber 10 when NaOH is consumed and then re-introducing a subsequent dose of reacting composition to continue depolymerization of the polymer (which, on the contrary, is introduced in one single initial loading batch).

The overall number of introductions and therefore the division of the reacting composition into doses is established to minimize the reaction time.

At the beginning of a depolymerization cycle and after introduction of the polymer material and pressurization of the reaction chamber 10, a first dose of reacting composition is introduced.

Advantageously, the reacting composition is introduced already at high temperature (indicatively, approximately 180° C.) to avoid the need for pre-heating inside the reactor 2. Also for this reason the reaction chamber 10 is already pressurized prior to introduction of the reacting composition.

Step b) Accelerated Reaction by Means of Microwaves.

After introducing the reagents (all the polymer material, for example PET, to be treated; and the first dose of reacting composition) and pressurizing the reaction chamber 10, the thermal control system 4 is activated to maintain a predefined reaction temperature inside the reaction chamber 10.

A first reaction step (depolymerization) of N successive reaction steps is then started.

In the reaction step:
  the mixing system 3 is started to keep stirred the mixture formed of the reacting composition (liquid) and the polymer (solid) and to distribute it inside the reaction chamber 10, so that the polymer is always wetted by the reacting composition and so as to also ease separation of the sodium terephthalate from the pieces (flakes) of polymer, ensuring that the polymer is always exposed to the reacting composition;
  the microwave generation and transport system 5 is on in order to accelerate the depolymerization reaction;
  the pressure inside the reaction chamber 10 is regulated around a predefined set-point, thanks to the introduction/extraction of nitrogen by means of the pressurization system 6.

In further detail: the mixing device 3 is started and rotates, mixing and stirring the contents of the reaction chamber 10 (solid polymer material and liquid reacting composition); and the microwave generation system 5 is activated to send microwaves into the reaction chamber 10.

The mixing device 3 rotates at a predefined speed, which can vary if necessary over time following a predefined cycle.

The mixing system 3 is configured so as to:
- ensure constant uniform mixing of the liquid and solid components contained in the reaction chamber 10, in particular to guarantee that the pieces (flakes, fibres, etc.) of polymer (for example PET) are always wetted by the reagents and to avoid accumulations in particular areas of the reaction chamber 10;
- dynamically distribute the polymer in the reaction chamber 10, due to the lifting action and then dropping by means of gravity exerted by the blades 33;
- avoid dynamic accumulations of liquid parts having characteristic dimension greater than the penetration capacity of the microwaves.

The blades 33 are therefore configured (namely they are shaped, sized and distributed) so as to ensure a high mixing and stirring capacity, but without introducing into the reaction chamber 10 too many metallic elements which could disturb transmission of the electromagnetic field.

A depolymerization reaction therefore takes place in the reaction chamber 10, essentially an alkaline hydrolysis which, in the case of depolymerization of PET, leads to progressive transformation of the PET into ethylene glycol (MEG), which is added to that already present in the reacting composition as co-solvent, and sodium terephthalate (Na2PTA) which, under the reaction conditions, will tend to deposit.

The operating conditions (in particular temperature, pressure and quantity of the reagents) of the depolymerization reaction are established according to the polymer material to be treated.

As already highlighted, the method of the invention comprises a sequence of reaction steps alternating with liquid phase extraction steps and consequent reintegration of the reacting composition, namely the liquid component of the reagents.

In each reaction step a minimum quantity of liquid reagents is dosed for a given time interval. In this way, a minimum quantity of reagents can be dosed and the high transparency of the PET and in general of other polymers to the microwaves is exploited to optimize use of the radiation.

Before supplying fresh reacting composition, a liquid phase is drawn from the reaction chamber 10 so as to increase the quantity of PET treated simultaneously without running the risk of large accumulations of liquid parts compromising penetration of the microwaves (which would induce "grey areas", where the reaction would not be accelerated).

Through an experimental characterization of the process, if necessary also supported by a pH sensor, it is determined when the depolymerization reaction is slowing down due to an excessively marked reduction in the NaOH concentration. The exceeding of a predefined threshold determines the transition to a subsequent liquid phase extraction and reintegration step or, if complete depolymerization has been achieved, transition to the drying step (described below).

Step c) Liquid Phase Extraction and Reintegration.

As mentioned above, each reaction step is followed by a liquid phase extraction and reintegration step, in which a liquid phase present in the reaction chamber 10 is extracted from the reaction chamber 10 and fresh reacting composition is introduced into the reaction chamber 10.

The extraction of the liquid phase serves to avoid the formation of excess accumulations of liquid inside the reaction chamber and is implemented, advantageously, by exploiting the pressure inside the reaction chamber 10, which is well above the atmospheric pressure (for example, greater than or equal to 7 barg).

After a predefined reaction period, in which the depolymerization reaction is carried out, the extraction duct is opened (it is kept shut during the reaction steps), provided with the filter 25; the pressure inside the reaction chamber 10 pushes the liquid present out of the reactor 2; the liquid is separated in the filter 25 from all the solid residues inside it, in particular: PET not yet reacted; solid terephthalate not dissolved; any other solid materials present (cotton, other plastics, solid contaminants, etc.), which remain in the reactor 2. A liquid stream is obtained containing substantially $H_2O$ and MEG and which, for example, is sent by means of the pump 26 to distillation towers for recovery.

Since the liquid stream flowing out of the reactor 2 also contains NaOH, in addition to $H_2O$ and MEG, a part of this liquid stream can be sent through the recycling duct 43 to reintegrate the supply of the reacting composition, merging into the duct 18.

In each liquid phase extraction and reintegration step, a new dose of reacting composition is introduced into the reaction chamber 10, through the duct 18.

Step d) Drying of Post-Reaction Solid Components.

After a sequence of N reaction steps alternating with N−1 liquid phase extraction/reintegration steps, when the polymer has been completely depolymerized, the final liquid phase extraction step is carried out, again through the extraction duct 24 and the filter 25 so as to retain in the reaction chamber 10 the terephthalate present. All the liquid phase removed is sent to the distillation steps.

Inside the reaction chamber 10 a wet sludge of sodium terephthalate forms containing contaminants and non-reacted solid residues. Before sending this material to the subsequent purification steps to separate and recover terephthalic acid (PTA), it is necessary to minimize the humidity due to the presence of residual water and glycol.

The recovery of water and glycol serves mainly not to compromise the overall production efficiency and because excess MEG in the subsequent PTA purification process could cause problems with the electrodes of the chlorine-soda plant responsible for the process.

Downstream of the last liquid phase extraction a drying step for drying the post-reaction solid components, in particular the sodium terephthalate, begins.

The drying step is conceived to dry the solid residue contained in the reactor 2 under the desired conditions; expediently, this occurs by using the same reactor 2, therefore without removing and transferring the product to be treated to other units.

The terephthalate drying step is in fact conducted, in accordance with the invention, inside the same reactor 2 in which the depolymerization reaction is conducted.

The drying step is conducted, advantageously, by jointly exploiting:
- the vacuum pump 29 which extracts gas from the reaction chamber until reaching an operating pressure well below the atmospheric pressure, for example lower than or equal to 0.05 atm; given that the final boiling temperature of the residual mixture is, at said pressure, decidedly lower than the operating pressure during the depolymerization, a first "flash" evaporation phenomenon occurs. The pump 29 then extracts from the reaction chamber 10 both nitrogen and water vapour and glycol, which are condensed and re-sent to the distillation towers while the nitrogen is re-sent to the pressurization system 6;
- the thermal control system 4 which operates in heating mode, supplying heat to the vessel 9 and then to the reaction chamber 10;

the microwave generation and transport system 5 that sends microwaves into the reaction chamber 10, at a power not necessarily equal to the power used for the depolymerization and optionally modulated during the drying step, to introduce energy directly into the residual liquid component inside the reaction chamber 10. Here the fact that the sodium terephthalate is substantially transparent to the microwaves is exploited, thus the majority of the microwaves will be absorbed by the liquid residue;

the mixing device 3 which is kept in rotation to facilitate evacuation of the vapour and avoid the formation of scale.

Since the content of the reactor 2 is at the reaction temperatures (for example, approximately 190° C. for the PET), the extraction of pressurized nitrogen from the inside of the reactor 2 until reaching a very low pressure (also significantly lower than 1 bar) by means of the pressurization system 6 automatically causes the evaporation of part of the mixture still contained in the terephthalate in the form of humidity.

At the same time, therefore, while nitrogen is extracted to reduce the internal pressure, the mixing device 3 is kept in rotation to stir the contents of the reaction chamber 10 and therefore facilitate evaporation of the liquid residues.

By maintaining the microwave generation and transport system 5 active, the radiation is exploited to complete evaporation of the liquid residues, which are practically the only ones to absorb the microwaves.

The MEG and $H_2O$ vapours which are extracted from the reactor 2 through the outlet 27 and the gas outlet duct 28 are re-condensed in the condenser 30 and sent, in turn, to the distillation towers by means of the recovery line 42. The nitrogen extracted from the reactor 2 for control of the pressure is recovered to re-pressurize the reactor 2 in a new production cycle.

Optionally, the gas outlet duct 28 and/or the pressurization system 6 can be provided with filters to collect any dust sucked in during the drying step.

Step e) Dissolution of the Post-Reaction Solid Components in Water.

Once the terephthalate drying step inside the reactor 2 has been completed, the clean water is introduced into the reaction chamber 10, through the duct 20 and the inlet 19, in a quantity equal to that necessary to guarantee dissolution of the entire PTA salt. An aqueous solution is obtained containing solid residues, but in reduced quantities and easy to filter outside the reactor 2. Simultaneously, the pressure inside the reactor 2 is re-set to atmospheric conditions or conditions of slight overpressure.

Using the outlet duct 22, the mixture is extracted from the reactor 2 and channeled towards a purification process of the terephthalic acid, conducted in known ways.

Figure 2:
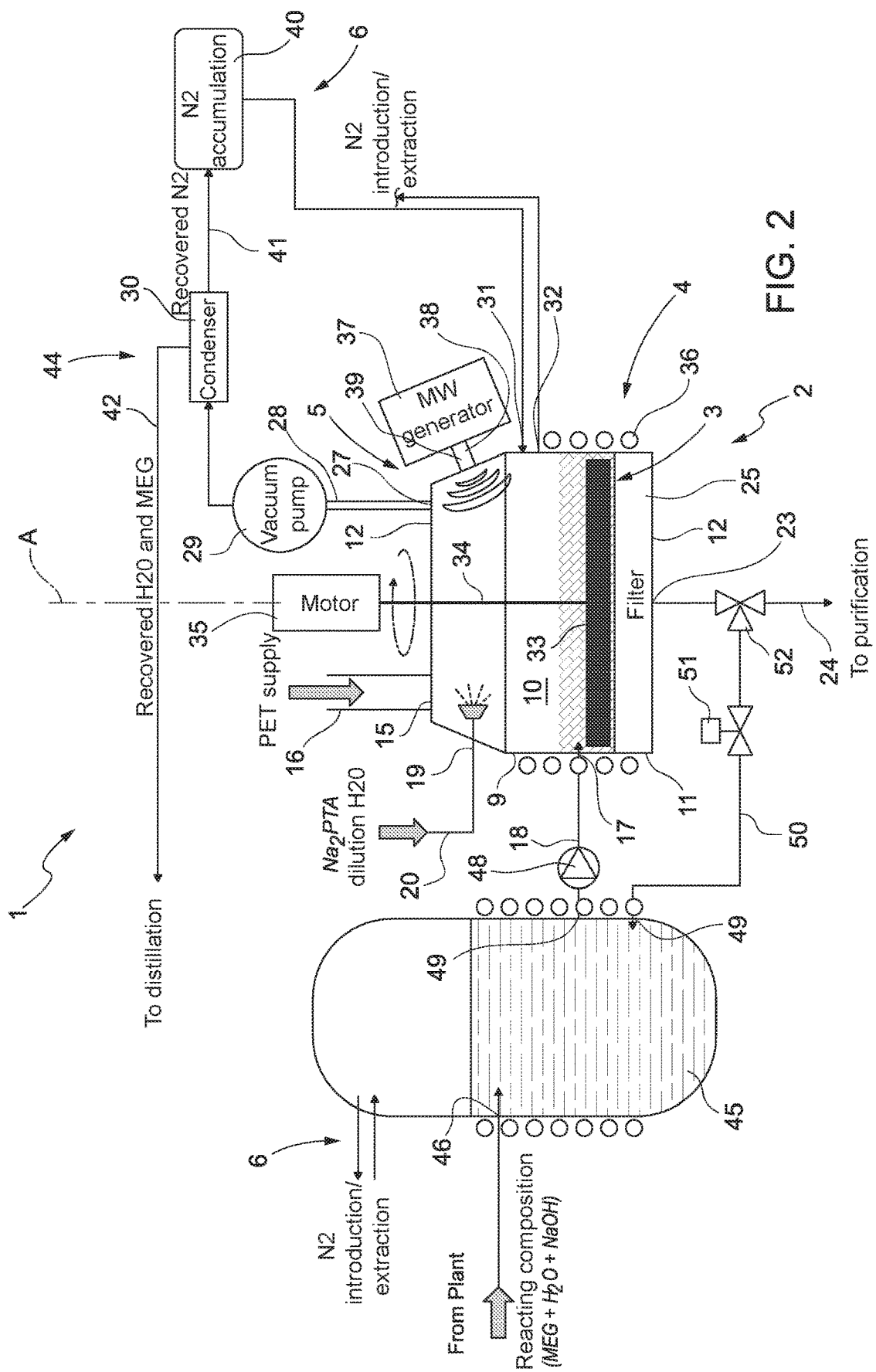
FIG. 2 shows in schematic form an apparatus for depolymerization of polymers in accordance with a second embodiment of the invention.

In the embodiment of FIG. 2, in which the details similar or equal to those already described are indicated by the same numbers, the apparatus 1 always comprises a microwave depolymerization reactor 2 provided with an internal mixing device 3, a thermal control system 4, a microwave generation and transport system 5, and a pressurization system 6.

With respect to the embodiment described previously with reference to FIG. 1, in this embodiment the reactor 2 and the relative vessel 9 extend along and around a longitudinal axis A which is substantially vertical in use.

The axis A defines again a rotation axis of the mixing device 3: in this case, therefore, the rotation axis is substantially vertical.

Also in this case, the mixing device 3 is configured so as to keep stirred, via its own rotary motion, the mixture of liquids and solids (polymer and reacting composition) contained in the vessel 9, distributing it dynamically inside the reaction chamber 10 both along the axis A, and radially relative to the axis A.

Advantageously the filter 25, designed to separate the liquid phase from the solid residues (non-reacted PET; non-dissolved solid terephthalate; any other solid materials present) is housed on the bottom of the vessel 9 at the lower terminal wall 12 and below the mixing device 3.

In particular, the filter 25 is positioned below the blades 33 (however they are configured) of the mixing device 3.

The filter 25 is configured so as to be crossed by the liquid phase present in the chamber 10 and retain in the chamber 10 the solid components, which form a filter cake above the filter 25.

As described previously, the liquid stream (containing substantially $H_2O$ and MEG) that crosses the filter 25 is removed from the reactor 2 through the liquid phase outlet 23 and sent via the extraction duct 24 to the recovery.

Advantageously, the mixing device 3, driven by the motor 35, is configured so that the structure 34 provided with the blades 33 is not only rotating around the axis A, but is also axially movable along the axis A, so as to exert a pressure on the filter cake created above the filter 25.

In the embodiment of FIG. 2, the reactor 2 therefore substantially integrates a Nutsche filter-dryer.

Clearly, also in this embodiment the mixing device 3 can take on various configurations, with blades 33 variously shaped and organized, also positioned on several rotors.

Also in this case the mixing device 3 is used during the depolymerization step to mix the polymer (PET), keep it well "wetted" with the reacting composition, and spread it inside the reaction chamber 10 so that it can be well irradiated by the microwaves; as in a traditional Nutsche filter-dryer, the mixing device 3 serves to maintain the upper surface of the drying cake smooth (during the filtering step) and to stir the material (during the drying step).

Also in this embodiment the reactor 2 is cooled or heated due to the thermal control system 4.

In addition or alternatively to the coil 36 described previously, the thermal control system 4 can also include a heating/cooling device acting directly on the mixing device 3 (namely on the structure 34 and/or on the blades 33), particularly useful in the vacuum drying step.

Also in this case, the microwave generation and transport system 5 introduces the microwaves required by the depolymerization reaction directly into the chamber 10 through a wave guide 39.

The configuration now described allows a variation of use of the apparatus 1 to be adopted, in particular during the depolymerization step. Instead of a sequence of reaction steps alternating with liquid phase extraction/reintegration steps, it is in fact possible to operate with a continuous liquid phase recirculation flow on the reactor 2.

For this purpose, the apparatus 1 includes a recirculation tank 45 which contains the reacting composition to be fed to the reactor 2.

The tank 45 has an inlet 46, connected to the mixing unit (not illustrated) in which the reacting composition is prepared; and a delivery outlet 47 connected to the reagent supply duct 18, optionally provided with a supply pump 48, and therefore to the liquid phase inlet 17 of the reactor 2.

The tank 45 also has a return inlet 49, connected to a recirculation duct 50, provided with a controlled valve 51 which branches off from the extraction duct 24 by means of a branch valve 52.

The tank 45 is in turn pressurized, for example in a nitrogen atmosphere and by means of the same pressurization system 6 of the reactor 2, at a controlled pressure (in particular greater than or equal to 7 barg, for example around 10 barg).

Advantageously, furthermore, the tank 45 is provided with a further thermal control system 54, for example comprising a liner 55 which externally envelops the tank 45 and in which a heating/cooling fluid circulates, to maintain controlled the temperature of the reacting composition which is supplied to the reactor 2, guaranteeing a finer adjustment compared to sole use of the thermal control system 4 integrated directly in the reactor 2.

At the beginning of a production cycle of the apparatus 1, the tank 45 is supplied with a quantity of reacting composition calculated for the entire production batch of the reactor 2.

The tank 45 supplies the reactor 2 continuously with the reacting composition.

Maintaining an appropriate pressure difference between reactor 2 and tank 45 (indicatively at least 3 bar), it is possible to extract a controlled flow of filtered mixture from the reactor 2.

Thanks to this approach it is possible to maintain inside the reactor 2 (after the initial loading step) a precise quantity (i.e., level) of reacting composition, while also ensuring that the concentration of the reagent involved in the depolymerization reaction (for example, sodium hydroxide for the PET) decays progressively parallel to evolution of the entire reaction (contrary to the discrete step operating mode).

Furthermore, thanks to a liner on the outside of the tank, it is possible to maintain the temperature of the reacting mixture in the reactor well controlled, guaranteeing finer adjustment compared to sole use of the cooling/heating system integrated directly in the reactor.

Clearly, the solutions described with reference to each of the preceding embodiments can be combined together.

Lastly, it is understood that further modifications and variations that do not depart from the scope of the attached claims can be made to the apparatus and method described and illustrated here.

The invention claimed is:

1. An apparatus for depolymerization of polymers selected from polyesters, polyamides, polyurethanes, and polycarbonates, comprising: a microwave depolymerization reactor, having a reactor vessel extending along and around a longitudinal axis and delimiting an internal reaction chamber in which a depolymerization reaction of the polymer to be treated with a liquid reacting composition takes place; a microwave generation and transport system for sending microwaves into the reaction chamber and comprising a microwave generator, located outside the vessel, and a guide device associated with the generator and housed in the reaction chamber to convey and distribute along and around the axis and in the reaction chamber the microwaves generated by the generator; a mixing device, housed in the reaction chamber and rotating around the axis and configured to keep stirred a mixture of liquids and solids contained in the reaction chamber, dynamically distributing said mixture inside the reaction chamber both along the axis and radially with respect to the axis and so as to ensure constant uniform mixing of the liquid and solid components contained in the reaction chamber and to guarantee that the pieces of polymer to be depolymerized are always wetted by the reagents and accumulations in particular areas of the reaction chamber are avoided, avoiding dynamic accumulations of liquid parts having characteristic dimension greater than the penetration capacity of the microwaves; and a pressurization system configured to adjust the pressure inside the reaction chamber both above and below atmospheric pressure; wherein the reactor is provided with: at least one solid phase inlet, connected to a polymer supply duct to supply the reaction chamber with said polymer material to be treated; a first liquid phase inlet, connected to a reagent supply duct, to supply the reaction chamber with said liquid reacting composition; a second liquid phase inlet, connected to an auxiliary supply duct, to supply the reaction chamber with auxiliary components; at least one reaction product outlet, connected to an outlet duct, to remove from the reaction chamber reaction products formed in the reaction chamber; at least one liquid phase outlet, connected to an extraction duct provided with a filter and with a drawing pump, to remove from the reaction chamber a liquid stream and retain in the reaction chamber solid residues separated from the liquid stream; at least one gas phase outlet, connected to a gas outlet duct provided with a vacuum pump and connected to a condenser, to extract a gas phase from the reaction chamber; a service inlet and a service outlet, connected to respective ducts of the pressurization system to introduce and extract inert gas into/from the reaction chamber.

2. An apparatus according to claim 1, wherein the guide device includes a waveguide having a pipe extending along the axis of the vessel and provided with lateral emission holes formed on a lateral wall of the pipe.

3. An apparatus according to claim 1, wherein the mixing device comprises a plurality of blades integrally supported by a supporting structure housed in the reaction chamber.

4. An apparatus according to claim 1, wherein the vessel is made of a metallic material opaque to microwave electromagnetic radiations.

5. An apparatus according to claim 1, comprising a thermal control system-configured so as to selectively extract heat from the reaction chamber or provide heat to the reaction chamber.

6. An apparatus according to claim 5, wherein the thermal control system comprises at least one coil wound around the vessel inside which a heat-transmitting fluid circulates, coming from a thermal unit where said fluid is heated or cooled; and/or a heating/cooling device acting directly on the mixing device.

7. An apparatus according to claim 1, wherein the pressurization system is configured to selectively inject inert gas into the reaction chamber and extract inert gas from the reaction chamber.

8. An apparatus according to claim 1, comprising a vacuum pump for the extraction, through a gas phase outlet, of a gas phase from the reaction chamber.

9. An apparatus according to claim 1, comprising a recovery circuit configured to recover a gas phase from the reaction chamber and then separate a condensate and a gas therefrom.

10. An apparatus according to claim 1, comprising a filter configured to separate a liquid stream from the mixture of liquids and solids contained in the reaction chamber, retaining in the reaction chamber solid residues separated from the liquid stream.

11. An apparatus according to claim 10, wherein the filter is positioned at a lower end wall of the vessel and below the mixing device.

12. An apparatus according to claim 1, wherein the reactor is provided with: at least one solid phase inlet, connected to a polymer supply duct to supply the reaction chamber with a polymer material to be treated; a first liquid phase inlet, connected to a reagent supply duct, to supply the reaction chamber with a liquid reacting composition; a second liquid phase inlet, connected to an auxiliary supply duct, to supply the reaction chamber with auxiliary components; at least one reaction product outlet, connected to an outlet duct, to remove from the reaction chamber reaction products formed in the reaction chamber; at least one liquid phase outlet, connected to an extraction duct provided with a filter and optionally with a drawing pump, to remove from the reaction chamber a liquid stream and retain in the reaction chamber solid residues separated from the liquid stream; at least one gas phase outlet, connected to a gas outlet duct provided with a vacuum pump and connected to a condenser, to extract a gas phase from the reaction chamber; a service inlet and a service outlet, connected to respective ducts of the pressurization system to introduce and extract inert gas into/from the reaction chamber.

13. An apparatus according to claim 1, comprising a recirculation tank containing the reacting composition to be fed to the reactor; and wherein the tank has a delivery outlet connected via a reagent supply duct to a liquid phase inlet of the reactor; and a return inlet connected via a recirculation duct to a liquid phase outlet of the reactor.

14. An apparatus according to claim 13, wherein the tank is pressurized to a controlled pressure, higher than the internal pressure of the reactor; and is provided with an additional thermal control system, for example comprising a liner that externally envelops the tank—and in which a heating/cooling fluid circulates, to keep controlled the temperature of the reacting composition in the tank.

15. A method for depolymerization of polymers selected from polyesters, polyamides, polyurethanes, and polycarbonates, comprising: a reagent supplying step, in which a reaction chamber, defined inside a reactor vessel and extending along and around an axis, is supplied with a polymer to be treated and a liquid reacting composition for a depolymerization reaction of the polymer; a depolymerization reaction step, in which microwaves are sent into the reaction chamber by means of a guide device housed in the reaction chamber to distribute the microwaves in the reaction chamber along and around the axis and activate the depolymerization reaction; in the reaction step, the polymer and the reacting composition contained in the reaction chamber being mixed and kept stirred by means of a mixing device rotating around the axis so as to dynamically distribute within the reaction chamber, both along the axis and radially with respect to the axis, a mixture formed by the polymer and the reacting composition, and so as to ensure constant uniform mixing of the liquid and solid components contained in the reaction chamber and to guarantee that the pieces of polymer to be depolymerized are always wetted by the reagents and accumulations in particular areas of the reaction chamber are avoided, avoiding dynamic accumulations of liquid parts having characteristic dimension greater than the penetration capacity of the microwaves; the reaction chamber being pressurized at a predefined pressure during the reaction step; at least one liquid phase extraction step, in which the liquid phase contained in the reaction chamber is pushed out of the reaction chamber and passes through a filter which separates solid residues, which are retained in the reaction chamber, from a liquid stream; and a drying step for drying said solid residues retained in the reaction chamber, said drying step being performed in the reaction chamber.

16. A method according to claim 15, wherein the polymer is first introduced into the reaction chamber, at atmospheric pressure; and then the reacting composition is introduced into the reaction chamber, after having pressurized the reaction chamber, in particular by introducing nitrogen or other inert gas into the reaction chamber.

17. A method according to claim 15, wherein the pressure of the reaction chamber at the time of supplying the reacting composition and during the reaction step is higher than or equal to 7 barg.

18. A method according to claim 15, comprising an initial supplying step, in which the reaction chamber is supplied with the whole amount of polymer to be treated and a first dose of reacting composition; and a plurality of reaction steps alternating with liquid phase extraction and reintegration steps; and wherein in each liquid phase extraction and reintegration step a liquid phase, containing reaction residues, is extracted from the reaction chamber and a new dose of fresh reacting composition is introduced into the reaction chamber.

19. A method according to claim 18, wherein in each liquid phase extraction and reintegration step an extraction duct, provided with a filter, is opened, so that the pressure inside the reaction chamber pushes the liquid phase contained in the reaction chamber out of the reaction chamber and the filter separates solid residues, which are retained in the reaction chamber, from a liquid stream.

20. A method according to claim 18, comprising, after a sequence of reaction steps alternating with liquid phase extraction and reintegration steps, a final liquid phase extraction step, in which the entire liquid phase present in the reaction chamber is removed from the reaction chamber.

21. A method according to claim 15, comprising, after the reaction step, a drying step for drying post-reaction solid components remaining in the reaction chamber; the drying step being performed in the reaction chamber, using one or more of: extracting gas from the reaction chamber by means of a vacuum pump until an operating pressure well below atmospheric pressure is reached, for example less than or equal to 0.05 atm; providing heat to the reaction chamber by means of a thermal control system operating in heating mode; sending microwaves into the reaction chamber, at a power not necessarily equal to that used for the depolymerization reaction and optionally modulated during the drying step, for providing energy directly to the residual liquid component inside the reaction chamber; mixing the content of the reaction chamber by means of the mixing device.

22. A method according to claim 21, comprising, after the drying step, a water dissolution step of the post-reaction solid components, in which water is introduced into the reaction chamber to dissolve solid components still present in the reaction chamber and obtain an aqueous solution containing solid residues, which is then removed from the reaction chamber by bringing the pressure inside the reaction chamber back to atmospheric conditions or slight overpressure conditions, for a new production cycle.

23. A method according to claim 15, comprising a step of drawing a gas phase from the reaction chamber by means of a vacuum pump, and sending said gas phase to a condenser to separate a condensate and a gas.

24. A method according to claim 15, wherein the reaction step is performed by feeding a continuous flow of liquid phase to the reactor; and the method comprises a step of recirculating to the reactor a liquid phase recovered stream taken from the reactor.

25. A method according to claim 24, comprising a step of controlling the temperature of the reacting composition fed to the reactor upstream of the reactor.

* * * * *